(12) United States Patent
Iwamori et al.

(10) Patent No.: US 12,462,146 B2
(45) Date of Patent: *Nov. 4, 2025

(54) NEURAL ODE FOR IRREGULARLY-SAMPLED TIME SERIES

(71) Applicant: INTERNATIONAL BUSINESS MACHINES CORPORATION, Armonk, NY (US)

(72) Inventors: Toshiya Iwamori, Tokyo (JP); Hiroki Yanagisawa, Kawasaki (JP); Akira Koseki, Yokohama (JP); Takayuki Katsuki, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1078 days.

This patent is subject to a terminal disclaimer.

(21) Appl. No.: 17/482,658

(22) Filed: Sep. 23, 2021

(65) Prior Publication Data

US 2023/0107294 A1 Apr. 6, 2023

(51) Int. Cl.
*G06F 17/00* (2019.01)
*G06N 3/049* (2023.01)
*G06N 3/10* (2006.01)

(52) U.S. Cl.
CPC .............. *G06N 3/049* (2013.01); *G06N 3/10* (2013.01)

(58) Field of Classification Search
CPC ........ G06N 3/044; G06N 3/084; G06N 20/00; G06N 3/10; G06N 7/01; G06N 5/04; G06N 3/049; G06N 3/08; H04L 63/1425; H04L 63/1416; H04L 63/1433; G04L 63/1433

USPC .......................................................... 706/15
See application file for complete search history.

(56) References Cited

U.S. PATENT DOCUMENTS

2019/0354836 A1 11/2019 Shah et al.

FOREIGN PATENT DOCUMENTS

CN 111832703 A 10/2020

OTHER PUBLICATIONS

M. Habiba and B. A. Pearlmutter, "Neural ODEs for Informative Missingess in Multivariate Time Series," 2020 31st Irish Signals and Systems Conference (ISSC), Letterkenny, Ireland, 2020, pp. 1-6, doi: 10.1109/ISSC49989.2020.9180216. (Year: 2020).*

(Continued)

*Primary Examiner* — Jason T Edwards
(74) *Attorney, Agent, or Firm* — Tutunjian & Bitetto, P.C.; Robert Richard Aragona (57) ABSTRACT

A computer-implemented method for updating hidden states in a recurrent neural network (RNN) to predict future data from multivariate time-series data with irregular time intervals is provided including inputting, for each of time steps at observations, observation data at a current time step in the multivariate time-series data to the RNN, for each of the time steps: subdividing a time interval between a previous time step and the current time step by a predetermined number, for each of subdivided time steps calculating a first element of the hidden state at a current subdivided time step using ODE-RNNs, and calculating a second element of the hidden state at the current subdivided time step using the last updated hidden state and a hidden state at the previous time step so that the last updated hidden state is decayed to be close to the hidden state at the previous time step.

20 Claims, 8 Drawing Sheets

(56) References Cited

OTHER PUBLICATIONS

Brouwer et al., "GRU-ODE-Bayes: Continuous modeling of sporadically-observed time series", 33rd Conference on Neural Information Processing Systems (NeurIPS 2019), Nov. 28, 2019, pp. 1-22.
Che et al., "Recurrent Neural Networks for Multivariate Time Series with Missing Values", Scientific Reports, Apr. 17, 2018, pp. 1-12.
Chen et al., "Neural Ordinary Differential Equations", 32nd Conference on Neural Information Processing Systems (NeurIPS 2018), Dec. 14, 2019, pp. 1-18.
Lechner et al., "Learning Long-Term Dependencies in Irregularly-Sampled Time Series", arXiv:2006.04418v4 [cs.LG] Dec. 4, 2020, pp. 1-19.
Ayyubi et al., "Progressive Growing of Neural Odes", arXiv:2003.03695v1 [cs.LG] Mar. 8, 2020, pp. 1-6.
Rubanova et al., "Latent ODEs for Irregularly-Sampled Time Series", 33rd Conference on Neural Information Processing Systems (NeurIPS 2019), Jul. 8, 2019, pp. 1-11.

\* cited by examiner

FIG. 8

NEURAL ODE FOR IRREGULARLY-SAMPLED TIME SERIES

BACKGROUND

The present invention relates generally to machine learning, and more specifically, to methods and systems for employing neural ordinary differential equations (ODE) for irregularly-sampled time series with long time intervals.

Recurrent neural networks (RNNs) are useful for learning patterns from regularly-sampled time series data, which have uniform time intervals between any two consecutive observations. In healthcare, irregular time intervals are common in multivariate time series data such as electronic health records (EHRs). Time intervals between two consecutive observations, such as for lab test results and medications, vary from patient to patient depending on their health conditions.

SUMMARY

In accordance with another embodiment, a computer program product for updating hidden states in a recurrent neural network (RNN) to predict future data from multivariate time-series data with irregular time intervals is provided. The computer program product includes a computer readable storage medium having program instructions embodied therewith, the program instructions executable by a computer to cause the computer to input, for each of time steps at observations, observation data at a current time step in the multivariate time-series data to the RNN, for each of the time steps: subdivide a time interval between a previous time step and the current time step by a predetermined number, for each of subdivided time steps: calculate a first element of the hidden state at a current subdivided time step using neural ordinary differential equations (Neural ODEs) based on a last updated hidden state and a time interval between a previous subdivided time step and the current subdivided time step, calculate a second element of the hidden state at the current subdivided time step using the last updated hidden state and a hidden state at the previous time step so that the last updated hidden state is decayed to be close to the hidden state at the previous time step based on a time interval between the current subdivided time step and the previous time step, and update the hidden state at the current subdivided time step to a weighted mean of the first element and second element.

In accordance with yet another embodiment, a system for updating hidden states in a recurrent neural network (RNN) to predict future data from multivariate time-series data with irregular time intervals is provided. The system includes a memory and one or more processors in communication with the memory configured to input, for each of time steps at observations, observation data at a current time step in the multivariate time-series data to the RNN, for each of the time steps: subdivide a time interval between a previous time step and the current time step by a predetermined number, for each of subdivided time steps: calculate a first element of the hidden state at a current subdivided time step using neural ordinary differential equations (Neural ODEs) based on a last updated hidden state and a time interval between a previous subdivided time step and the current subdivided time step, calculate a second element of the hidden state at the current subdivided time step using the last updated hidden state and a hidden state at the previous time step so that the last updated hidden state is decayed to be close to the hidden state at the previous time step based on a time interval between the current subdivided time step and the previous time step, and update the hidden state at the current subdivided time step to a weighted mean of the first element and second element.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for employing neural ordinary differential equations (Neural ODEs) for irregularly-sampled time series with long time intervals. The exemplary methods refer to time series data with uniform time intervals as regularly-sampled time series data and time series data with irregular time intervals as irregularly-sampled time series data.

Recurrent neural networks (RNNs) struggle to handle irregular time intervals because RNNs ignore differences in time intervals between observations. To handle irregular time intervals in RNNs, existing methods apply an exponential decay to hidden states on the basis of the elapsed time to adjust irregular time intervals. Even though this approach considers irregular time intervals, it cannot capture long-term dependencies due to hidden states decaying close to zero.

In other approaches, Neural ODEs define continuously hidden states as the solution to the ODE initial value problem. Neural ODEs can represent hidden dynamics without any assumption like an exponential decay because hidden states are defined at any time. However, Neural ODEs have difficulties modeling hidden states that can change depending on the observations because they update all hidden states to be defined depending only on the initial state. In healthcare, inputs can drastically change at particular observations, such as when a patient's condition drastically changes. In such cases, hidden states should also represent dynamics depending on the observation.

ODE-RNNs are elegant solutions for handling these challenges. In ODE-RNNs, hidden states are updated with RNNs for each observation, and hidden states between observations are defined at any time with Neural ODEs. ODE-RNNs can capture the discrete dynamics of hidden states depending on the observation and capture the continuous dynamics of hidden states with Neural ODEs. However, ODE-RNNs face difficulties handling long time intervals between two observations. They assume that time intervals are short enough that hidden states updated with Neural ODEs do not significantly change. Therefore, hidden states can significantly change from hidden states updated with RNNs at the previous observation when the time intervals are long because Neural ODEs continue to update hidden states over long time intervals due to a lack of observations.

The exemplary embodiments introduce an ODE-RNN based model, which is referred to as ODE-Gate RNN. ODE-Gate RNNs control hidden states updated with Neural ODEs so that they change only moderately for long time intervals. ODE-Gate RNNs have two components for controlling hidden states. One is a gate mechanism that controls how much information from values generated with Neural ODEs will be carried over to the next hidden states for each update of Neural ODEs. The other is a decay mechanism. Even though the gate mechanism controls the values of hidden states updated by Neural ODEs, hidden states may significantly change for time intervals that are too long. Therefore, the exemplary methods also use a decay mechanism that applies a decay to hidden states updated with Neural ODEs so that they are close to the hidden states last updated with RNNs at the last observation on the basis of the elapsed time.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
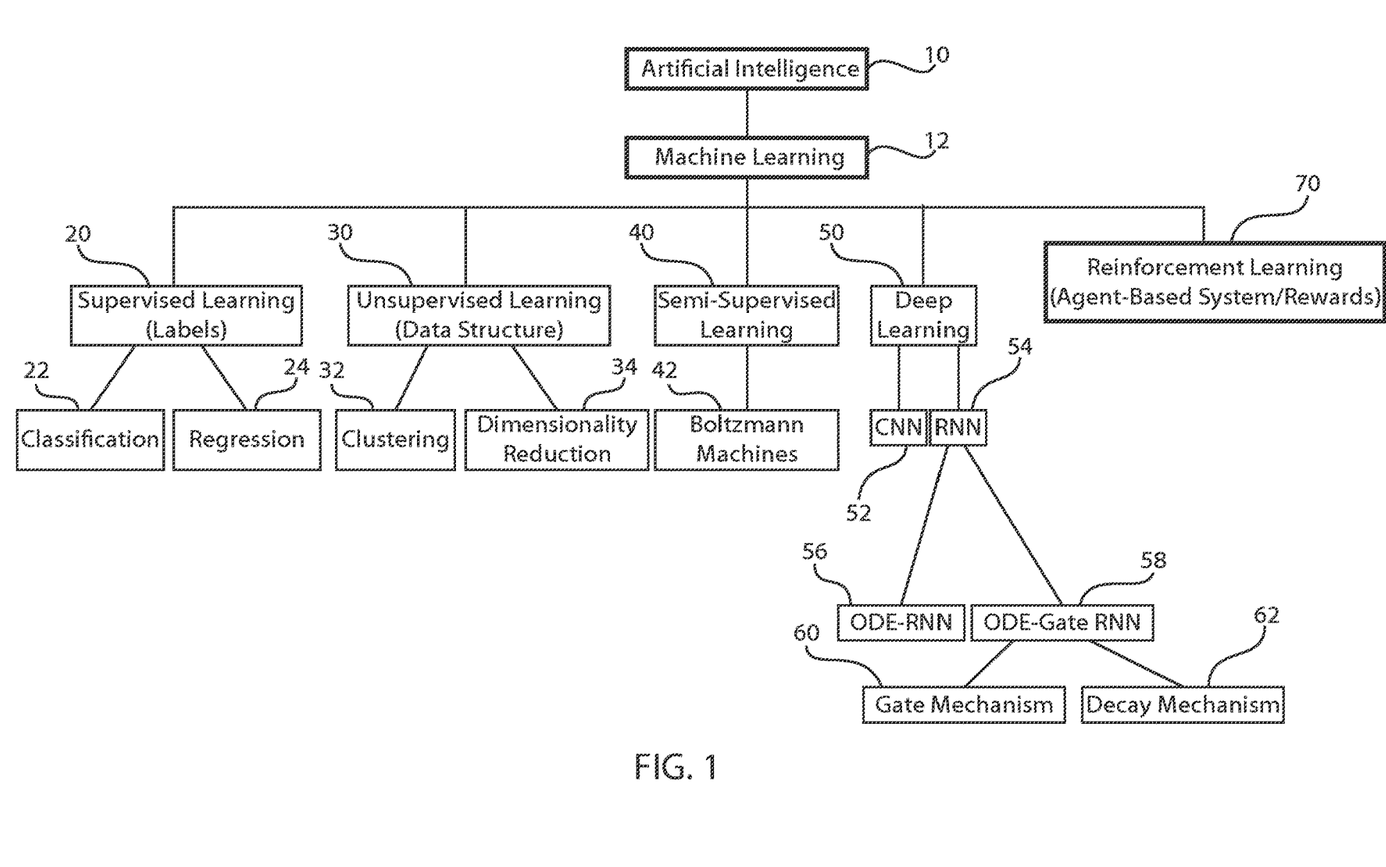
FIG. 1 is a block/flow diagram of an exemplary breakdown of machine learning in artificial intelligence (AI) and where ODE-Gate RNN fits in, in accordance with an embodiment of the present invention.

FIG. 1 is a block/flow diagram of an exemplary breakdown of machine learning in artificial intelligence (AI) and where Fitted Q-Iteration fits in, in accordance with an embodiment of the present invention.

Artificial intelligence 10 includes machine learning 12. Machine learning 12 can be divided into supervised learning 20, unsupervised learning 30, semi-supervised learning 40, deep learning 50, and reinforcement learning 70.

Supervised learning 20 can include, e.g., classification 22 and regression 24.

Unsupervised learning 30 can include, e.g., clustering 32 and dimensionality reduction 34.

Semi-supervised learning 40 can include, e.g., application of Boltzmann machines 42.

Deep learning 50 can include, e.g., convolutional neural networks (CNN) 52 and recurrent neural networks (RNN) 54.

RNNs 54 can include ODE-RNNs 56 and ODE-gate RNNs 58.

ODE-gate RNNs 58 can include a gate mechanism 60 and a decay mechanism 62. The ODE-gate RNNs 58 will be discussed in detail with reference to FIGS. 2-4.

Figure 2:
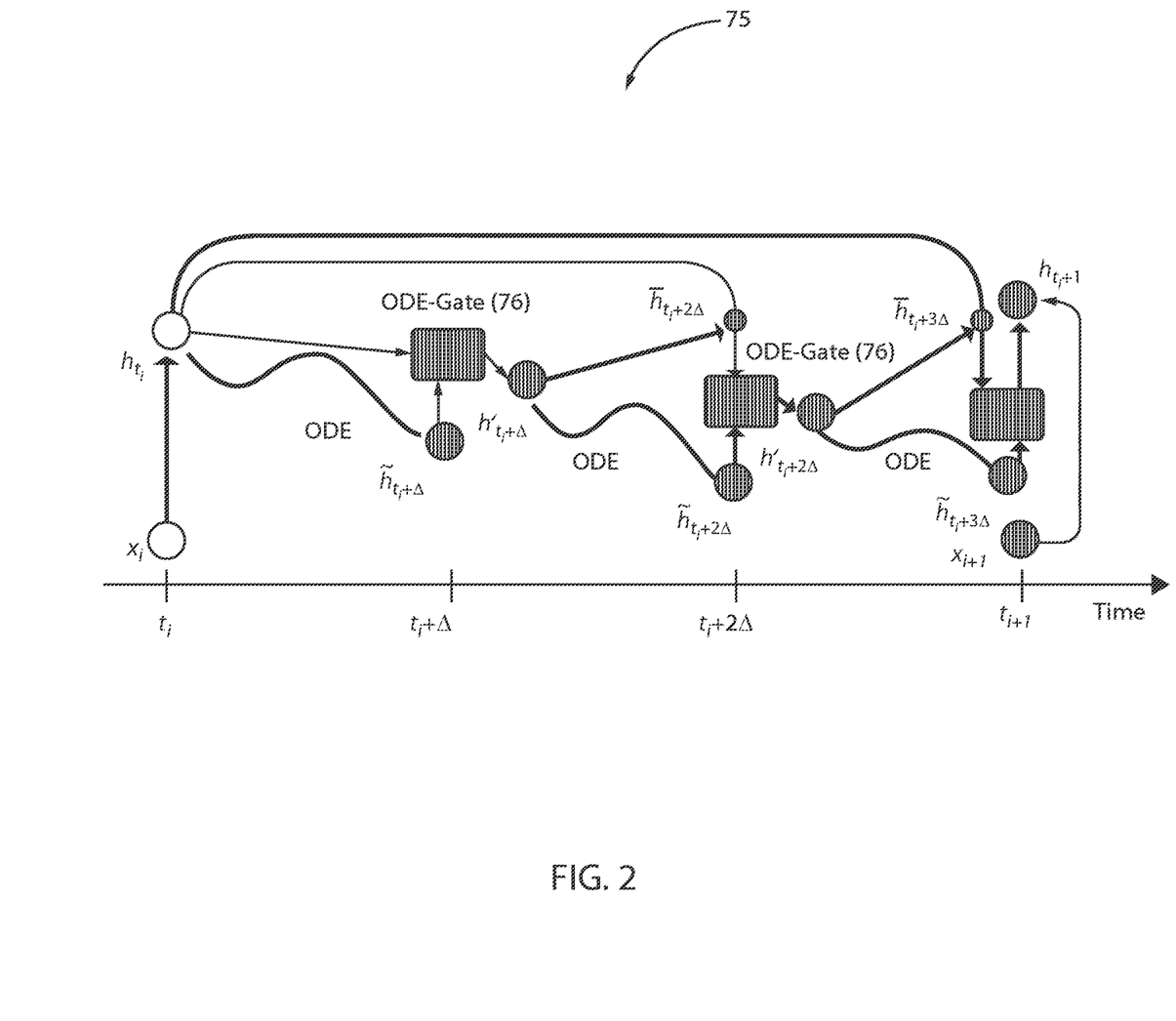
FIG. 2 illustrates an exemplary ODE-Gate RNN architecture, in accordance with an embodiment of the present invention.

FIG. 2 illustrates an exemplary ODE-Gate RNN architecture, in accordance with an embodiment of the present invention.

In the ODE-gate RNN architecture 75, hidden states are controlled with gate and decay mechanisms (76) for each step of neural ODEs. Before the ODE-gate RNN architecture 75 is discussed, a review of RNNs, neural ODEs, and ODE-RNNs will be presented.

It is assumed that each record is represented as a sequence of observations, $X=\{x_1, \ldots, x_i, \ldots, x_T\}$, where the i-th element is a D-dimensional feature vector, $x_i \in \mathbb{R}^D$, $x_i$ is an observation at time step i, and T is the total number of observations. A timestamp is denoted as $t=(t_1, \ldots, t_i, \ldots, t_T)$, where the i-th element is a time stamp at the i-th observation, $t_i \in \mathbb{R}_0^+$, and the time stamp of the first observation is 0 (i.e., $t_1=0$). A time interval is denoted as $\delta=\{\delta_1, \ldots, \delta_i, \ldots, \delta_{T-1}\}$, where its i-th element is the time interval between observations $x_i$ and $x_{i+1}$ (i.e., $\delta_i=t_{i+1}-t_i$).

Regarding recurrent neural networks, RNNs update hidden states from inputs of observations. In RNNs, a hidden state is defined for discrete times $t_1, t_2, \ldots, t_T$, as follows:

$$h_{t+1}=\text{RNNCell}(h_{t_i}, x_{i+1})$$

where RNNCell is a recurrent layer of an RNN, and $h_{t_i}$ and $h_{t_{i+1}}$ are the current and next hidden states.

Several studies have proposed applying an exponential decay to hidden states in order to handle irregular time intervals, e.g.:

$$h_{t_{i+1}}=\text{RNNCell}(\exp(-\tau\delta_i)h_{t_i}, x_{i+1})$$

where $\tau$ is a decay rate parameter.

Regarding neural ordinary differential equations, neural ODEs define hidden states as the solution to an ODE initial value problem, such as, e.g.:

$$\frac{dh_t}{dt} = f_\theta(h_t, t)$$

where $f_\theta$ is a neural network whose weights $\theta$ are network parameters.

The hidden states are defined at all times $t \in R$ by Neural ODEs.

$$h_{t_i}=h_{t_0}+\int_{t_0}^{t_i} f_\theta(h_t,t)dt=\text{ODESolve}(f_\theta, h_{t_0},(t_0,t_i))$$

where $t_0$ is the initial time, $h_0$ is the initial state of hidden states, and ODESolve is an ODE Solver.

Regarding ODE-RNNs, ODE-RNNs are hybrid models with RNNs and Neural ODEs. In ODE-RNNs, hidden states are updated with inputs for each observation, and hidden states between observations are defined at any time t by Neural ODEs. Therefore, ODE-RNNs can capture not only the continuous dynamics of hidden states but also the discrete dynamics of hidden states with observations. This can be accomplished by:

$$h_{t_i}' = h_{t_i} + \int_{t_i}^{t_{i+1}} f_\theta(h_t, t)dt = ODESolve(f_\theta, h_{t_i}, (t_i, t_{i+1}))$$

$$h_{t_{i+1}} = RNNCell(h_{t_i}', x_{i+1})$$

Next, the operations of ODE-RNNs are explained. First, ODE-RNNs define a step size $\Delta$ that is a very small time step. The step size $\Delta$ is denoted as the minimum time step with which Neural ODEs can update hidden states with an ODE solver. To define a step size $\Delta$, the exemplary methods define the maximum step size $\Delta_{max}$ and then define a number, $$\left\lceil \frac{\delta_i}{\Delta_{max}} \right\rceil,$$

that is the number of steps $N_s$, that is, the number of times Neural ODEs update hidden states. Next, the time step $$\Delta = \frac{\delta_i}{N_s}$$

is defined.

Then, ODE-RNNs generate new hidden states $h_{t_{i+\Delta}}$ with the ODE solver from hidden states $h_{t_i}$. ODE-RNNs continue to update hidden states with Neural ODEs $N_s$ times. Finally, ODE-RNNs generate hidden states with RNNs from hidden states updated with Neural ODEs. ODE-RNNs perform these operations for each observation.

ODE-RNNs have difficulties capturing the dynamics of hidden states when there are long time intervals between two consecutive observations because they assume that the time interval is short. Hidden states updated with Neural ODEs $h_{t_i}'$ can significantly change from hidden states updated with RNNs at the last observation $h_{t_i}$ when the time intervals are long because Neural ODEs continue updating hidden states over long time intervals.

The exemplary embodiments introduce a new variant of ODE-RNNs, called an ODE-Gate RNN, which handles long time intervals between observations. ODE-Gate RNNs control hidden states for long time intervals between observations so that hidden states updated with Neural ODEs change moderately from hidden states updated with RNNs at the previous observation.

FIG. 2 is the architecture 75 of the ODE-Gate RNN. ODE-Gate RNNs have two components (76). One is a gate mechanism that controls how much information from values updated with Neural ODEs will carry over to the next hidden states for each update of Neural ODEs. The other is a decay mechanism that controls hidden states on the basis of the elapsed time from the last observation. Even if hidden states are controlled, they may significantly change when time intervals are too long. Therefore, the exemplary methods use the decay mechanism to handle time intervals that are too long.

The algorithm is described by focusing on the differences between the ODE-Gate RNNs and ODE-RNNs. First, hidden states updated with an ODE solver for the j-th step are defined the same as ODE-RNNs. The hidden states updated with the ODE solver for the j-th step are denoted by $\tilde{h}_{t_i+j\Delta}$ for $j \in \{1, 2, \ldots, N_s\}$ in the following equations:

$$\tilde{h}_{t_i+j\Delta} = h'_{t_i+(j-1)\Delta} + \int_{t_i+(j-1)\Delta}^{t_i+j\Delta} f_\theta(h'_t, t)dr$$

$$= ODESolve(f_\theta, h'_{t_i+(j-1)\Delta}, (t_i + (j-1)\Delta, t_i + j\Delta))$$

where $h_{t_i+(j-1)\Delta}'$ is the last updated hidden states, and $h_{t_i}'$ is $h_{t_i}$, which is the hidden states updated with RNNs at the i-th observation.

Next, unlike ODE-RNNs, ODE-Gate RNNs use gate and decay mechanisms (76) to control the hidden states $\bar{h}_{t_i+j\Delta}$ before the next update. More specifically, using a gate $g_{t_i}$, ODE-Gate RNNs generate new hidden states $h_{t_i+j\Delta}'$ using the weighted mean of the hidden states updated with the ODE solver $\tilde{h}_{t_i+j\Delta}$ and a decayed last hidden states $\bar{h}_{t_i+j\Delta}$.

The decayed last hidden states $\bar{h}_{t_i+j\Delta}$ are the last updated hidden states $h_{t_i+(j-1)\Delta}'$ decayed to be close to hidden states updated with RNNs $h_{t_i}$ on the basis of the time interval between the current time stamp and a time stamp at the last observation. The exemplary methods can use an exponential decay $\exp(-j\Delta)$ for a decay rate $\gamma_{j\Delta}$.

The hidden states $h_{t_i+j\Delta}'$ are defined as:

$$h_{t_i+j\Delta}' = g_{t_i+j\Delta} \circ \tilde{h}_{t_i+j\Delta} + (1 - g_{t_i+j\Delta}) \bar{h}_{t_i+j\Delta},$$

$$g_{t_i+j\Delta} = \sigma(V\tilde{h}_{t_i+j\Delta} + b),$$

$$\bar{h}_{t_i+j\Delta} = \gamma_{j\Delta} h_{t_i+(j-)\Delta}' + (1-\gamma_{j\Delta}) h_{t_i},$$

$$\gamma_{j\Delta} = \exp(-j\Delta),$$

where the operator $\sigma$ is a sigmoid function, and $V \in \mathbb{R}^{H \times H}$ and $b \in \mathbb{R}^H$ are the network parameters, and H is the number of units of the hidden nodes.

Finally, ODE-Gate RNNs generate hidden states $ht_{i+1}$ from the last updated hidden states $h_{t_i+\Delta N_s}'$, such that:

$$h_{t_{i+1}} = RNNCell(h_{t_i+\Delta N_s}', x_{i+1})$$

Algorithm 1, reproduced below, shows the algorithm for ODE-Gate RNNs.

---

Algorithm 1 ODE-Gate RNN.

Input: feature vectors, their time stamps, and a max step size $\{(x_i, t_i)\}_{i=1\ldots T}, \Delta_{max}$
1:   Let $h_0 = 0$.
2:   $h_{t_i} = RNNCell(h_0, x_1)$
3:   for i in 1, 2, ..., T – 1 do
4:     $h'_{t_i} = h_{t_i}$
5:     $\delta_i = t_{i+1} - t_i$
6:     $N_s = \left\lceil \dfrac{\delta_i}{\Delta_{max}} \right\rceil$
7:     $\Delta = \dfrac{\delta_i}{N_s}$
8:     for j in 1, 2, ..., $N_s$ do
9:       $\tilde{h}_{t_i+j\Delta} = ODESolve(f_\theta, h'_{t_i+(j-1)\Delta}, (t_i + (j-1)\Delta, t_i + j\Delta))$
10:      $g_{t_i+j\Delta} = \sigma(V\tilde{h}_{t_i+j\Delta} + b)$
11:      $\gamma_{j\Delta} = \exp(-j\Delta)$
12:      $\bar{h}_{t_i+j\Delta} = \gamma_{j\Delta} \circ h'_{t_i+(j-1)\Delta} + (1 - \gamma_{j\Delta}) \circ h_{t_i}$
13:      $h'_{t_i+j\Delta} = g_{t_i+j\Delta} \circ \tilde{h}_{t_i+j\Delta} + (1 - g_{t_i+j\Delta}) \circ \bar{h}_{t_i+j\Delta}$
14:     end for
15:     $h_{t_{i+1}} = RNNCELL(h'_{t_i+N_{step}\Delta}, x_{i+1})$
16:   end for
17:   Return $\{h_{t_i}\}_{i=1\ldots T}$

---

To understand the ODE-Gate RNN algorithm, assume the case where j is small. When j is small, $\exp(-j\Delta) \cong 0$ because the time step $\Delta$ is very small. The following equation is obtained:

$$h'_{t_i+j\Delta} \simeq g_{t_i+j\Delta} \circ \bar{h}_{t_i+j\Delta} + (1 - g_{t_i+j\Delta}) \circ h'_{t_i+(j-1)\Delta},$$

$$= g_{t_i+j\Delta} \circ \left( h'_{t_i+(j-1)\Delta} + \int_{t_i+(j-1)\Delta}^{t_i+j\Delta} f_\theta(h'_t, t) dt \right) + (1 - g_{t_i+j\Delta}) \circ h'_{t_i+(j-1)\Delta}$$

$$= h'_{t_i+(d-1)\Delta} + g_{t_i+j\Delta} \circ \int_{t_i+(j-1)\Delta}^{t_i+j\Delta} f_\theta(h'_t, t) dt.$$

It is found that the gate affects only values generated with the ODE solver, while the gate does not affect the last updated hidden states $h_{t_i+(j-1)\Delta}$' from the equation above. ODE-Gate RNN mainly controls the hidden states updated with the ODE solver so that the hidden states change moderately when the number of steps is small. When the number of steps is large, ODE-Gate RNN also controls the hidden states updated by the ODE solver so that the hidden states are close to hidden states updated with RNNs at the last observation.

Figure 3:
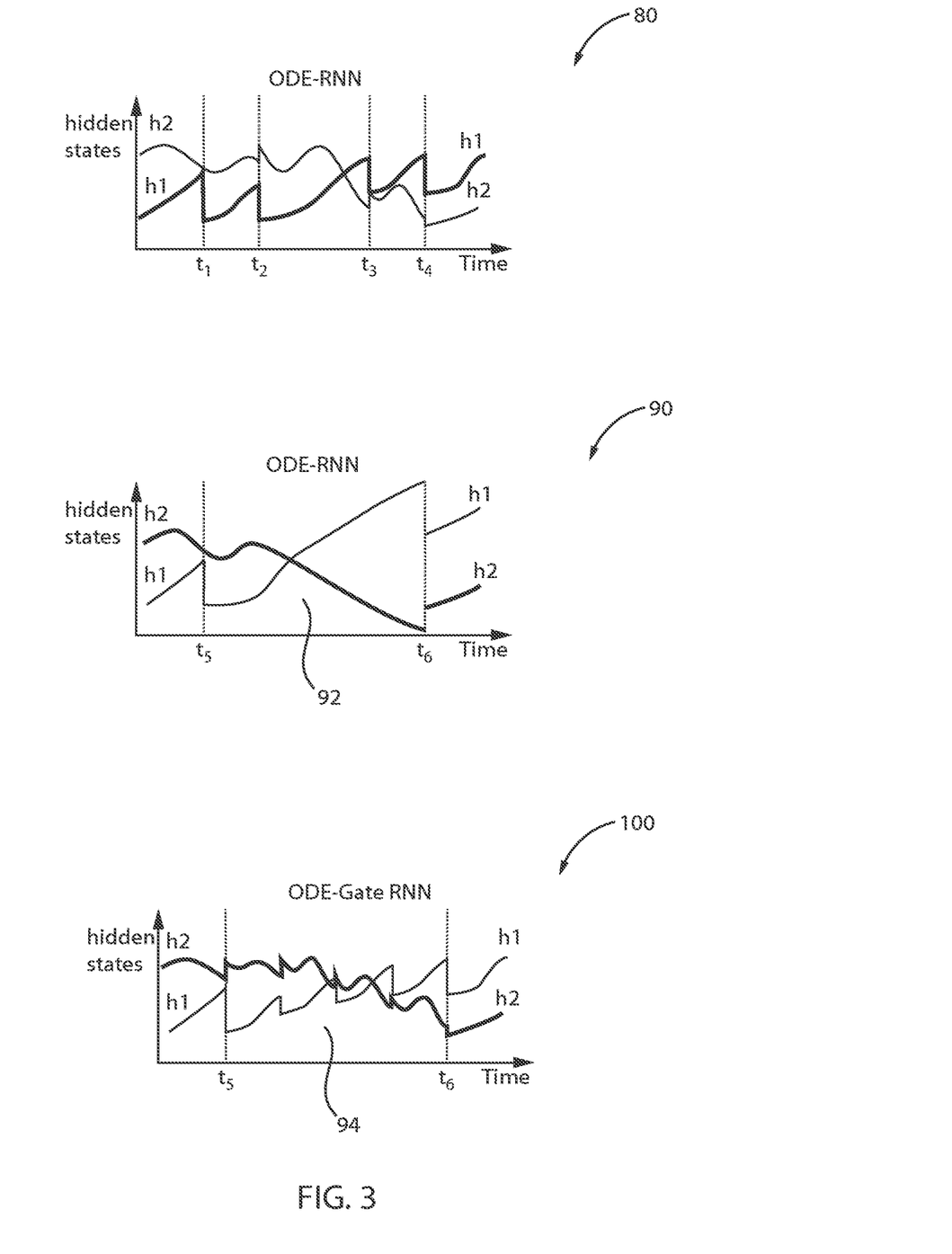
FIG. 3 illustrates exemplary hidden state trajectories, in accordance with an embodiment of the present invention.

FIG. 3 illustrates an exemplary hidden state trajectories, in accordance with an embodiment of the present invention.

FIG. 3 illustrates hidden state trajectories. Dotted lines represent observation times. The ODE-RNNs 80 appropriately capture dynamics of hidden states in short time intervals (left-hand side). The hidden states of ODE-RNNs 90 can significantly change from previous hidden states when time interval is too long because they continue to update hidden states unless hidden states are updated with RNNs (center illustration). The ODE-Gate RNNs 100 control hidden states updated with Neural ODEs so that hidden states change from previous hidden states for long time intervals using gate and decay mechanisms (right-hand side).

ODE-RNN 80 depicts hidden state trajectory $h_1$ and hidden state trajectory $h_2$. The hidden state trajectories $h_1$ and $h_2$ change direction or paths at the times $t_1, t_2, t_3, t_4$. The time intervals $t_1, t_2, t_3, t_4$ are short time intervals.

ODE-RNN 90 depicts hidden state trajectory $h_1$ and hidden state trajectory $h_2$. The hidden state trajectories $h_1$ and $h_2$ change direction or paths at the times $t_5, t_6$. The time interval 92 between to and $t_6$ is a long time interval. As noted above, such long time intervals 92 cannot be successfully handled by ODE-RNNs.

ODE-gate RNN 100, in accordance with the exemplary embodiments of the present invention, depicts hidden state trajectory $h_1$ and hidden state trajectory $h_2$. The hidden state trajectories $h_1$ and $h_2$ change direction or paths at the times $t_5, t_6$. The time interval 94 between to and $t_6$ is a long time interval. However, the introduction of gate mechanisms and decay mechanisms (not found in ordinary ODE-RNNs) control the hidden states so that the hidden states change moderately. As such, the hidden state trajectory $h_1$ and hidden state trajectory $h_2$ in time interval 94 (between to and $t_6$) changes direction or paths several times.

Figure 4:
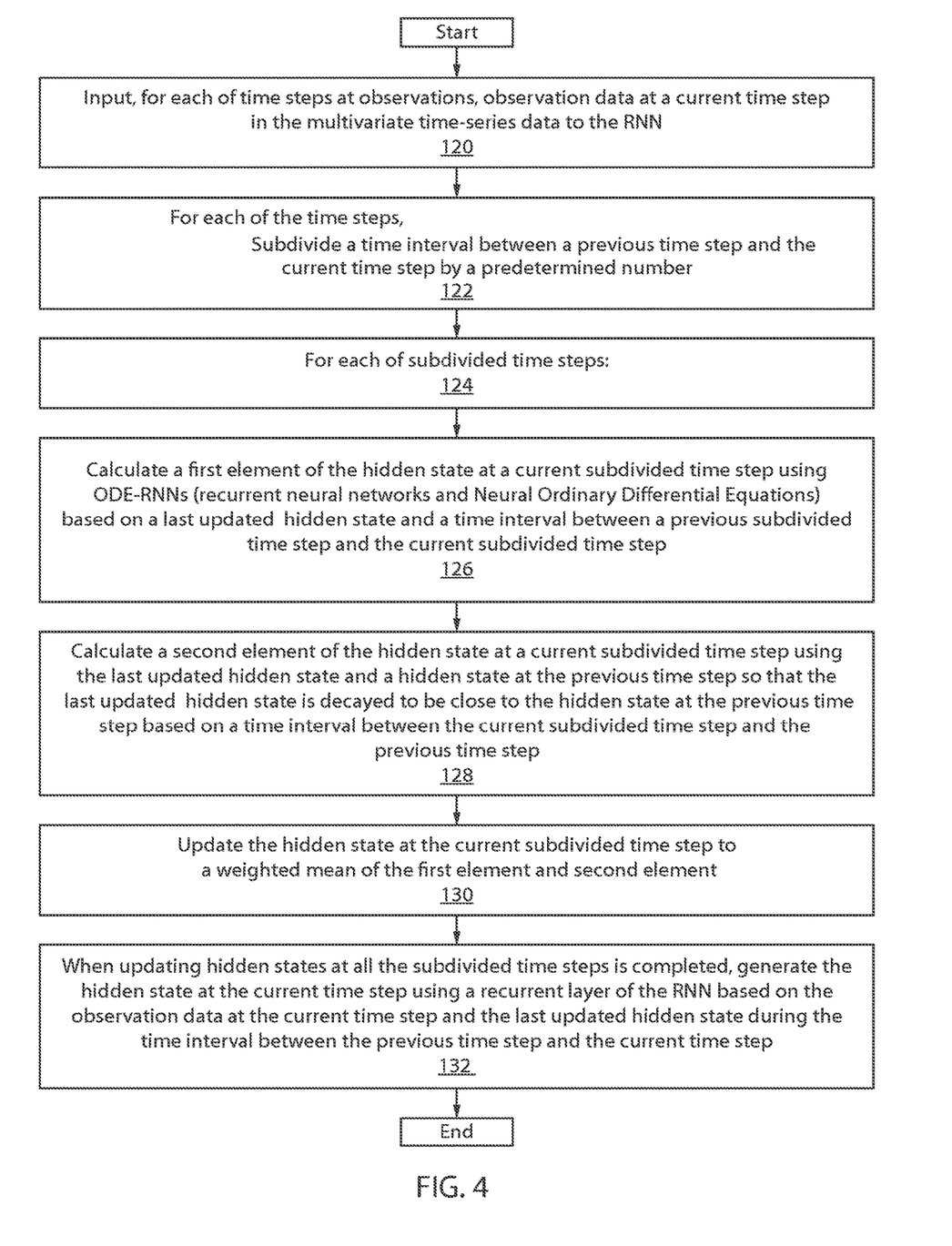
FIG. 4 illustrates an exemplary method for employing ODE-Gate RNN, in accordance with an embodiment of the present invention.

FIG. 4 illustrates an exemplary method for employing ODE-Gate RNN, in accordance with an embodiment of the present invention.

At block 120, input, for each of time steps at observations, observation data at a current time step in the multivariate time-series data to the RNN.

At block 122, for each of the time steps, subdivide a time interval between a previous time step and the current time step by a predetermined number.

At block 124, for each of subdivided time steps, execute the next steps.

At block 126, calculate a first element of the hidden state at a current subdivided time step using Neural ODEs (Neural Ordinary Differential Equations) based on a last updated hidden state and a time interval between a previous subdivided time step and the current subdivided time step.

At block 128, calculate a second element of the hidden state at the current subdivided time step using the last updated hidden state and a hidden state at the previous time step so that the last updated hidden state is decayed to be close to the hidden state at the previous time step based on a time interval between the current subdivided time step and the previous time step.

At block 130, update the hidden state at the current subdivided time step to a weighted mean of the first element and second element.

At block 132, when updating hidden states at all the subdivided time steps is completed, generate the hidden state at the current time step using a recurrent layer of the RNN based on the observation data at the current time step and the last updated hidden state during the time interval between the previous time step and the current time step.

In conclusion, ODE-RNNs, which are hybrid models with RNNs and Neural ODEs, are effective for modeling irregularly-sampled time series data, which continuously define hidden states between observations with Neural ODEs. However, ODE-RNNs face difficulties with handling long time intervals between two consecutive observations in irregularly-sampled data.

When time intervals are too long, hidden states can significantly change from the previous ones because Neural ODEs continue to update hidden states over long time intervals. The exemplary embodiments introduce an ODE-RNN based model, which is referred to as ODE-Gate RNN.

ODE-Gate RNNs control hidden states with gate and decay mechanisms so that hidden states updated with Neural-ODEs change moderately. ODE-Gate RNNs have two components that control the values of hidden states. One is a gate mechanism that controls how much information from hidden states updated with Neural ODEs will be carried over to the next hidden states. The other is a decay mechanism that applies a decay to hidden states updated with Neural ODEs so that they are close to hidden states updated with RNNs on the basis of the elapsed time from the previous observation.

Thus, ODE-Gate RNNs control hidden states for long time intervals between observations so that hidden states updated with Neural ODEs change moderately from hidden states updated with RNNs at the previous observation. As noted, ODE-Gate RNNs have two components in addition to regular ODE-RNNs. A gate mechanism which replaces hidden states with the weighted mean of hidden states $\bar{h}_{t_i+j\Delta}$ updated by the ODE solver and hidden states $\tilde{h}_{t_i+j\Delta}$ computed by a decay mechanism. The decay mechanism computes the hidden states $\tilde{h}_{t_i+j\Delta}$ by computing the weighted mean of the last updated hidden states $h'_{t_i+(j-1)\Delta}$ and hidden states $h_{t_i}$ updated by RNNs at the last observation on the basis of the elapsed time $j\Delta$.

Figure 5:
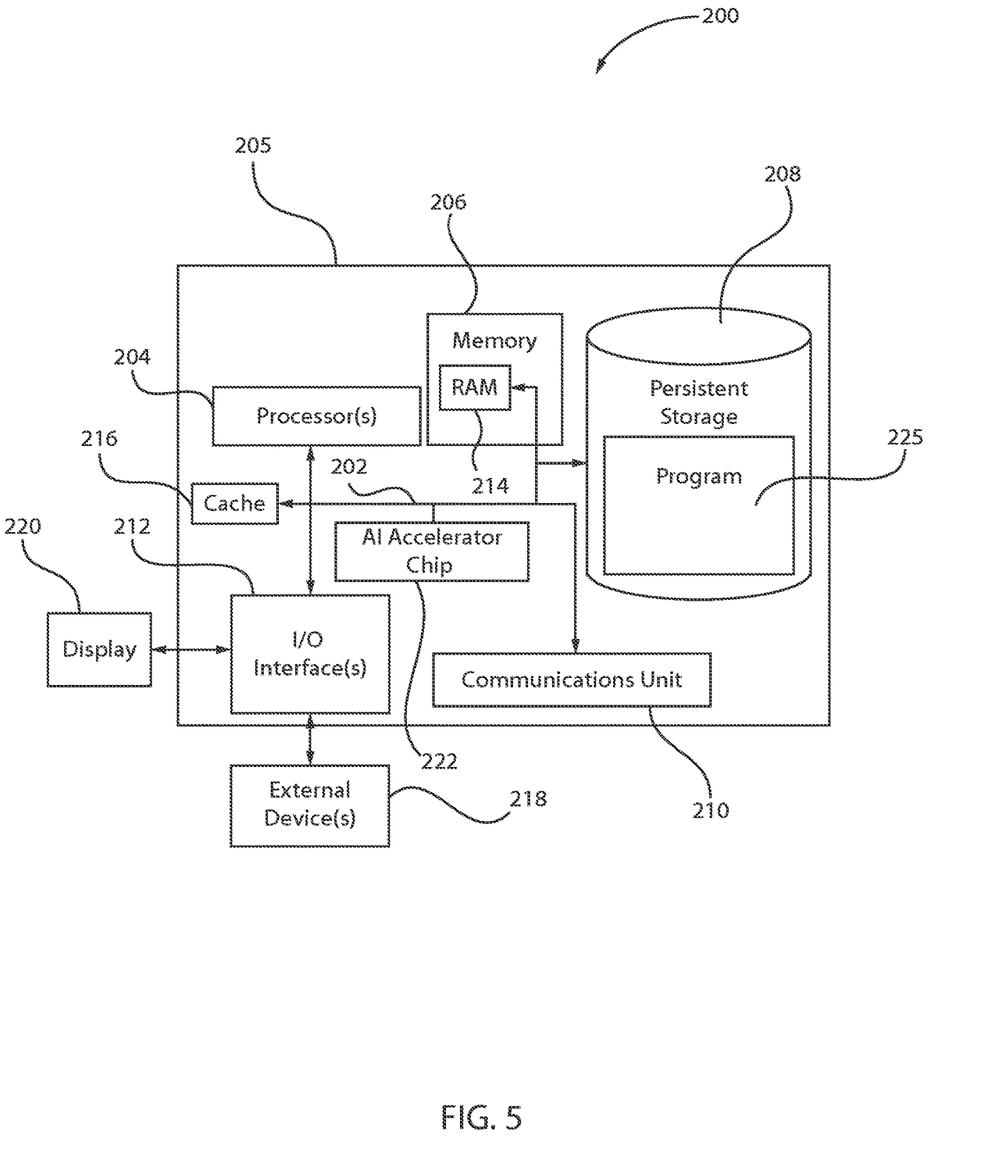
FIG. 5 is a block/flow diagram of an exemplary processing system for employing ODE-Gate RNN, in accordance with an embodiment of the present invention.

FIG. 5 is a block/flow diagram of an exemplary processing system for employing the ODE-Gate RNN, in accordance with an embodiment of the present invention.

FIG. 5 depicts a block diagram of components of system 200, which includes computing device 205. It should be appreciated that FIG. 5 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 (to implement ODE-Gate RNN) in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 6:
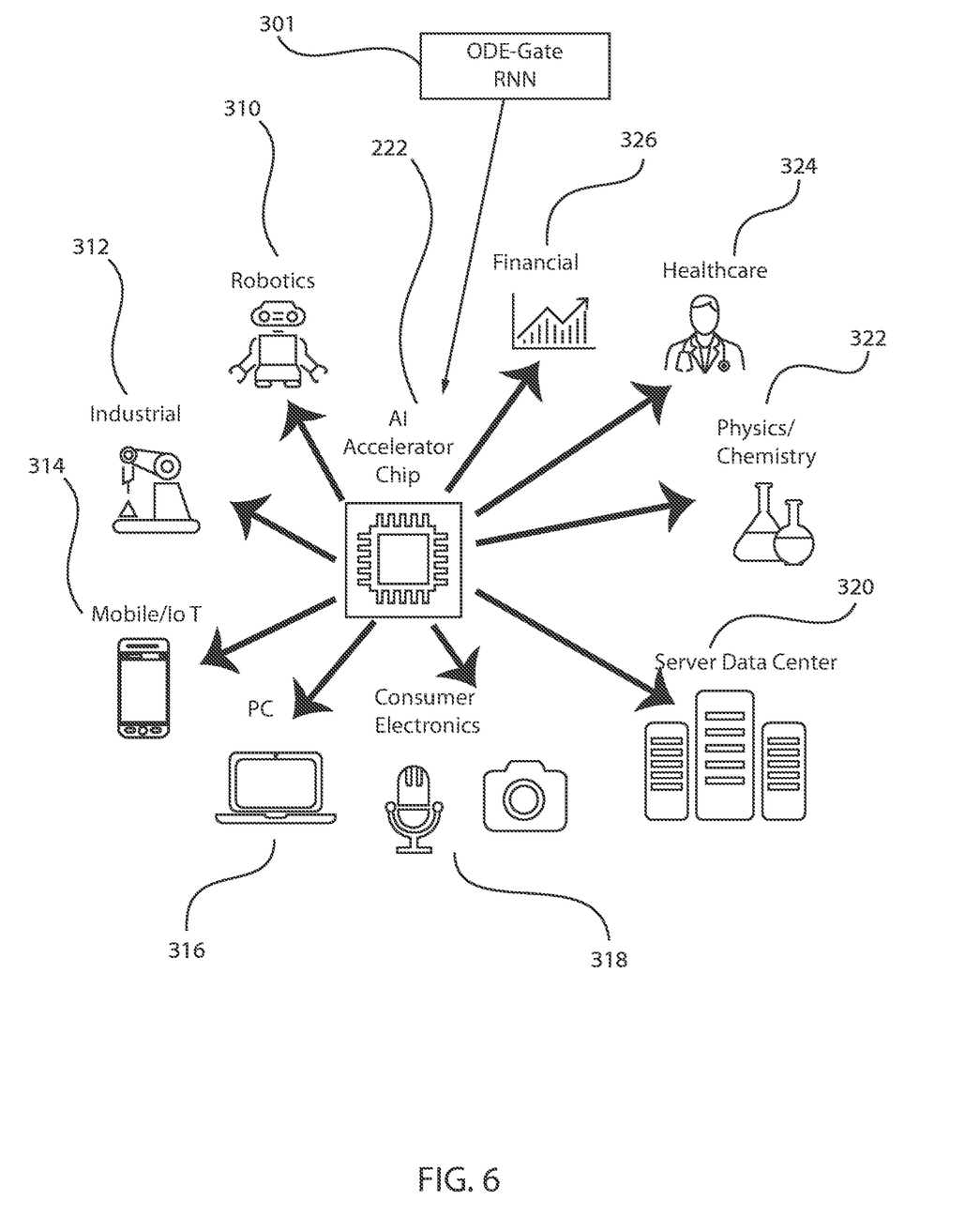
FIG. 6 illustrates practical applications for employing ODE-Gate RNN via an artificial intelligence (AI) accelerator chip, in accordance with an embodiment of the present invention.

FIG. 6 illustrates practical applications for employing the ODE-Gate RNN via an artificial intelligence (AI) accelerator chip, in accordance with an embodiment of the present invention.

The artificial intelligence (AI) accelerator chip 222 can implement the ODE-Gate RNN 301, and can be used in a wide variety of practical applications, including, but not limited to, robotics 310, industrial applications 312, mobile or Internet-of-Things (IoT) 314, personal computing 316, consumer electronics 318, server data centers 320, physics and chemistry applications 322, healthcare applications 324, and financial applications 326.

Figure 7:
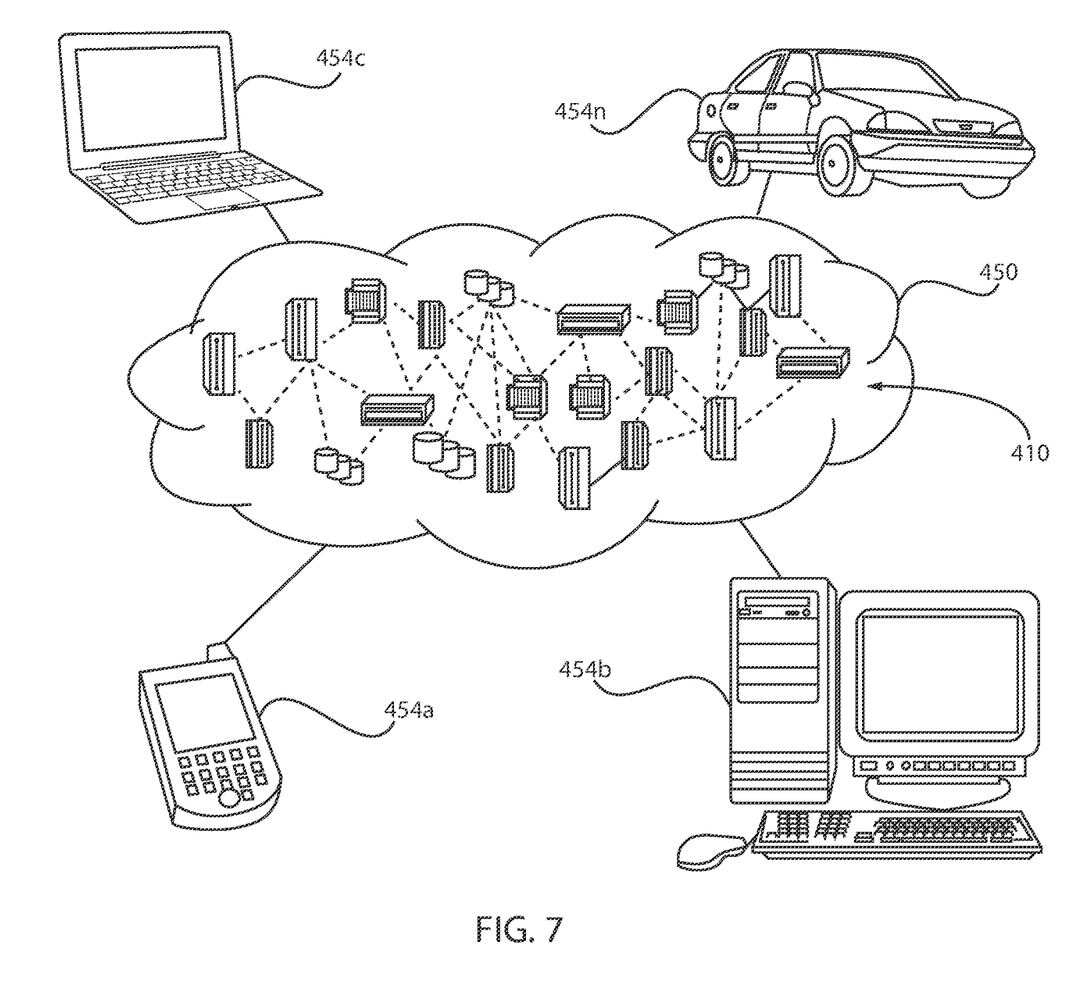
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 7 are intended to be illustrative only and that computing nodes 410 and cloud computing environment 450 can communicate with any type of computerized device over any type of network and/or network addressable connection (e.g., using a web browser).

Figure 8:
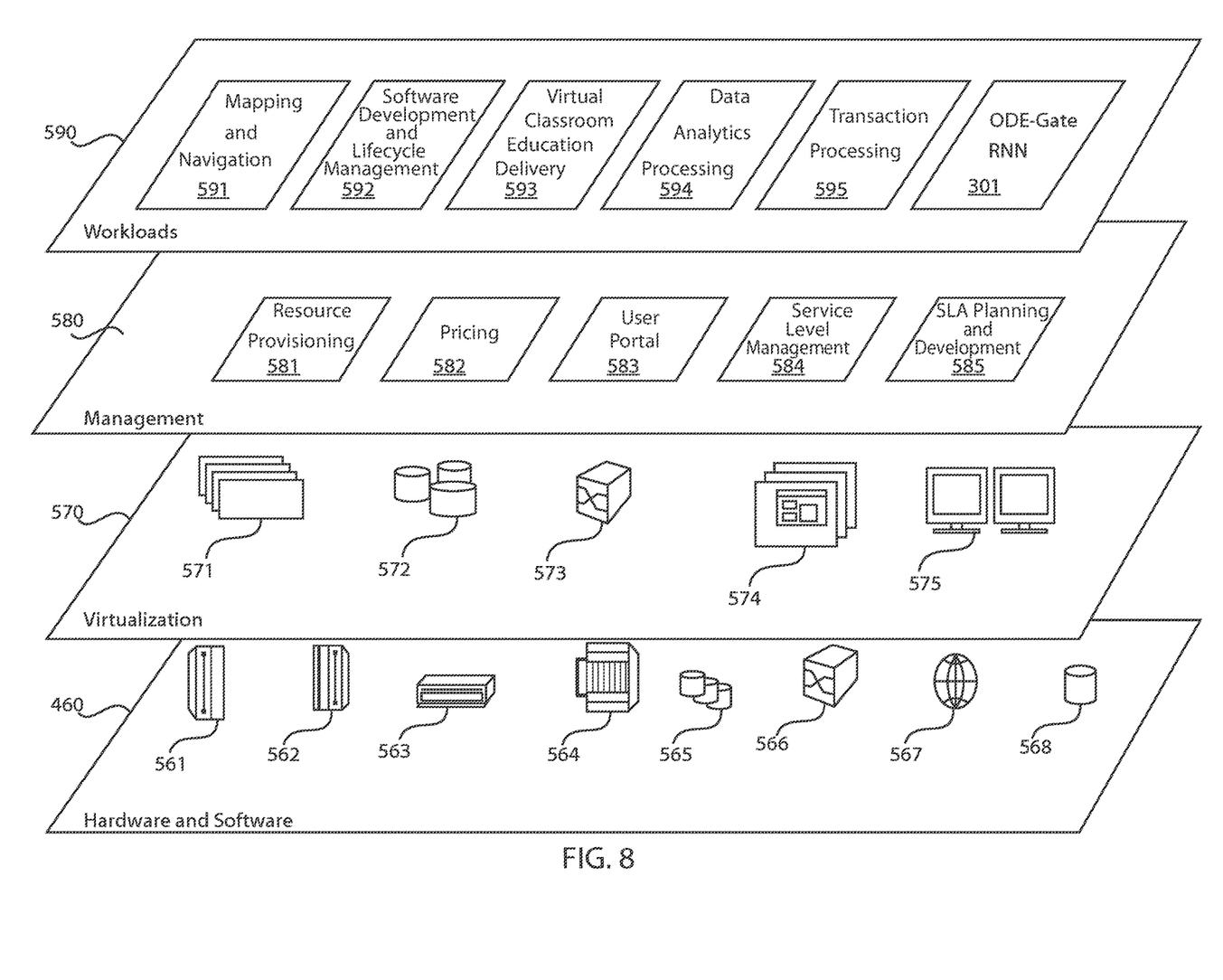
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and ODE-Gate RNN 301.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s).

In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for employing neural ordinary differential equations (ODE) for irregularly-sampled time series with long time intervals (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for updating hidden states in a recurrent neural network (RNN) to predict future data from multivariate time-series data with irregular time intervals, the method comprising:
controlling an amount of information that the RNN updates to a next hidden state for irregularly sampled time series data on a basis of elapsed time and capturing discrete dynamics of hidden states by inputting, for each time step at observations, observation data at a current time step in the multivariate time-series data to the RNN;
for each of the time steps:
subdividing a time interval between a previous time step and the current time step by a predetermined number, wherein subdivided time intervals between adjacent time steps are equal;
for each of subdivided time steps:
calculating a first element of the hidden state at a current subdivided time step using neural ordinary differential equations (Neural ODEs) based on a last updated hidden state and a time interval between a previous subdivided time step and the current subdivided time step;
calculating a second element of the hidden state at the current subdivided time step using the last updated hidden state and a hidden state at the previous time step so that the last updated hidden state is decayed to be close to the hidden state at the previous time step based on a time interval between the current subdivided time step and the previous time step; and
updating the hidden state at the current subdivided time step to a weighted mean of the first element and second element.

2. The computer-implemented method of claim 1, wherein, when updating hidden states at all the subdivided time steps is completed, generating the hidden state at the current time step using a recurrent layer of the RNN based on the observation data at the current time step and the last updated hidden state during the time interval between the previous time step and the current time step.

3. The computer-implemented method of claim 1, wherein the first element is a gate mechanism and the second element is a decay mechanism.

4. The computer-implemented method of claim 3, wherein the gate mechanism controls how much information from values generated with neural ODEs is carried over to next hidden state for each update of the neural ODEs.

5. The computer-implemented method of claim 3, wherein the decay mechanism applies a decay to the hidden state updated with neural ODEs.

6. The computer-implemented method of claim 5, wherein the hidden state updated with neural ODEs are close to hidden states last updated with RNNs based on elapsed time from a last observation.

7. The computer-implemented method of claim 2, wherein the generated hidden state is given as:

$$h_{t_i+1} = \text{RNNCell}(h'_{t_i + \Delta N_s}, x_{i+1})$$

where RNNCell is a recurrent layer of the RNN, $h'_{t_i + \Delta N_s}$ is a hidden state before a next update, and $x_{i+1}$ is an observation at time step i+1.

8. A computer program product for updating hidden states in a recurrent neural network (RNN) to predict future data from multivariate time-series data with irregular time intervals, the computer program product comprising a computer readable storage medium having program instructions embodied therewith, the program instructions executable by a computer to cause the computer to:
control an amount of information that the RNN updates to a next hidden state for irregularly sampled time series data on a basis of elapsed time and capturing discrete dynamics of hidden states by causing the computer to input, for each time step at observations, observation data at a current time step in the multivariate time-series data to the RNN;
for each of the time steps:
subdivide a time interval between a previous time step and the current time step by a predetermined number, wherein subdivided time intervals between adjacent time steps are equal;
for each of subdivided time steps:
calculate a first element of the hidden state at a current subdivided time step using neural ordinary differential equations (Neural ODEs) based on a last updated hidden state and a time interval between a previous subdivided time step and the current subdivided time step;
calculate a second element of the hidden state at the current subdivided time step using the last updated hidden state and a hidden state at the previous time step so that the last updated hidden state is decayed to be close to the hidden state at the previous time step based on a time interval between the current subdivided time step and the previous time step; and
update the hidden state at the current subdivided time step to a weighted mean of the first element and second element.

9. The computer program product of claim 8, wherein, when updating hidden states at all the subdivided time steps is completed, generating the hidden state at the current time step using a recurrent layer of the RNN based on the observation data at the current time step and the last updated hidden state during the time interval between the previous time step and the current time step.

10. The computer program product of claim 8, wherein the first element is a gate mechanism and the second element is a decay mechanism.

11. The computer program product of claim 9, wherein the gate mechanism controls how much information from values generated with neural ODEs is carried over to next hidden state for each update of the neural ODEs.

12. The computer program product of claim 9, wherein the decay mechanism applies a decay to the hidden state updated with neural ODEs.

13. The computer program product of claim 12, wherein the hidden state updated with neural ODEs are close to hidden states last updated with RNNs based on elapsed time from a last observation.

14. The computer program product of claim 9, wherein the generated hidden state is given as:

$$h_{t_i+1} = \text{RNNCell}(h'_{t_i + \Delta N_s}, x_{i+1})$$

where RNNCell is a recurrent layer of the RNN, $h'_{t_i + \Delta N_s}$ is a hidden state before a next update, and $x_{i+1}$ is an observation at time, step i+1.

15. A system for updating hidden states in a recurrent neural network (RNN) to predict future data from multivariate time-series data with irregular time intervals, the system comprising:
- a memory; and
- one or more processors in communication with the memory configured to:
  - control an amount of information that the RNN updates to a next hidden state for irregularly sampled time series data on as basis of elapsed time and capturing discrete dynamics of hidden states by causing the one or more processors to input, for each time step at observations, observation data at a current time step in the multivariate time-series data to the RNN;
  - for each of the time steps:
    - subdivide a time interval between a previous time step and the current time step by a predetermined number, wherein subdivided time intervals between adjacent time steps are equal;
  - for each of subdivided time steps:
    - calculate a first element of the hidden state at a current subdivided time step using neural ordinary differential equations (Neural ODEs) based on a last updated hidden state and a time interval between a previous subdivided time step and the current subdivided time step;
    - calculate a second element of the hidden state at the current subdivided time step using the last updated hidden state and a hidden state at the previous time step so that the last updated hidden state is decayed to be close to the hidden state at the previous time step based on a time interval between the current subdivided time step and the previous time step; and
    - update the hidden state at the current subdivided time step to a weighted mean of the first element and second element.

16. The system of claim 15, wherein, when updating hidden states at all the subdivided time steps is completed, generating the hidden state at the current time step using a recurrent layer of the RNN based on the observation data at the current time step and the last updated hidden state during the time interval between the previous time step and the current time step.

17. The system of claim 15, wherein the first element is a gate mechanism and the second element is a decay mechanism.

18. The system of claim 16, wherein the gate mechanism controls how much information from values generated with neural ODEs is carried over to next hidden state for each update of the neural ODEs.

19. The system of claim 16, wherein the decay mechanism applies a decay to the hidden state updated with neural ODEs.

20. The system of claim 19, wherein the hidden state updated with neural ODEs are close to hidden states last updated with RNNs based on elapsed time from a last observation.

* * * * *